United States Patent
Schmitt

Patent Number: 6,101,714
Date of Patent: Aug. 15, 2000

[54] METHOD OF MAKING A CATALYTIC CONVERTER FOR USE IN AN INTERNAL COMBUSTION ENGINE

[75] Inventor: Paul S. Schmitt, Big Flats, N.Y.

[73] Assignee: Corning Incorporated, Corning, N.Y.

[21] Appl. No.: 09/130,172

[22] Filed: Aug. 6, 1998

Related U.S. Application Data

[60] Provisional application No. 60/058,386, Sep. 8, 1997.

[51] Int. Cl.[7] ...................................................... B23P 15/00
[52] U.S. Cl. .................................. 29/890; 29/463; 29/520
[58] Field of Search .......................... 29/890, 446, 419.1, 29/463, 520; 422/180

[56] References Cited

U.S. PATENT DOCUMENTS

| | | |
|---|---|---|
| 3,958,312 | 5/1976 | Weaving et al. . |
| 4,070,158 | 1/1978 | Siebels . |
| 4,093,423 | 6/1978 | Neumann . |
| 4,148,120 | 4/1979 | Siebels . |
| 4,343,074 | 8/1982 | Bailey et al. . |
| 4,397,817 | 8/1983 | Otani et al. . |
| 4,400,860 | 8/1983 | Nonnenmann et al. . |
| 4,504,294 | 3/1985 | Brighton . |
| 4,765,047 | 8/1988 | Retallick ..................................... 29/890 |
| 4,865,818 | 9/1989 | Merry et al. . |
| 4,969,265 | 11/1990 | Ehara ......................................... 29/890 |
| 4,985,212 | 1/1991 | Kawakami et al. . |
| 5,082,479 | 1/1992 | Miller . |
| 5,096,011 | 3/1992 | Ishikawa et al. . |
| 5,119,551 | 6/1992 | Abbott . |
| 5,302,355 | 4/1994 | Fujikura . |
| 5,329,698 | 7/1994 | Abbott . |
| 5,346,675 | 9/1994 | Usui et al. . |
| 5,666,726 | 9/1997 | Robinson et al. . |
| 5,729,902 | 3/1998 | Wieres et al. . |

*Primary Examiner*—Irene Cuda
*Attorney, Agent, or Firm*—Timothy M. Schaeberle

[57] ABSTRACT

A method of manufacturing a catalytic converter for purifying exhaust gases from an internal combustion engine wherein the converter exhibits a monolithic ceramic substrate surrounded by a supporting mat. The method includes the steps of: wrapping the substrate in a sufficient amount of supporting mat material and inserting the wrapped substrate into the metal shell; forming a cylindrical metal shell having an inner surface exhibiting substantially the same curvature as the wrapped substrate; compressively closing the metal shell around the wrapped substrate to an optimized mat density range thereby resulting in the supporting mat exhibiting a substantially uniform and maximum safe compressive stress on the substrate; and, securing together metal shell to provide a gas tight seal and to hold the compressive stress. The optimized mat density range determined by plotting the mat density-mat holding pressure relationship and the mat density-retained cyclic strength ratio relationship of the supporting mat material on a common graph and selecting an optimized range on the mat density-mat holding pressure, and thereafter obtaining the corresponding optimized mat density range.

10 Claims, 4 Drawing Sheets

METHOD OF MAKING A CATALYTIC CONVERTER FOR USE IN AN INTERNAL COMBUSTION ENGINE

This application claims the benefit of U.S. Provisional Application Ser. No. 60/058,386, filed Sep. 8, 1997, entitled "METHOD OF MAKING A CATALYTIC CONVERTER FOR USE IN AN INTERNAL COMBUSTION ENGINE" by Paul S. Schmitt.

BACKGROUND OF THE INVENTION

1. Field of the Invention

The invention relates to a process for the production of catalytic converters for purifying exhaust gases, and more particularly to a method for producing the catalytic converter comprising compressively closing the metal shell around the supporting mat-wrapped honeycomb substrate using an optimized mat density, resulting in a catalytic converter having a uniform and maximum safe compressive force exerted upon the honeycomb substrate.

2. Description of the Related Art

As is well known, the purification of exhaust gases from internal combustion engines, particularly in motor vehicles, is generally achieved by an exhaust gas purification system in which a ceramic element having a honeycomb cell structure acts as a catalyst carrier. More precisely, this honeycomb cell structure is covered with a catalyst which contains a precious metal which functions, in the presence of $O_2$, to convert noxious components of the exhaust gas, such as HC and CO, to $CO_2$ and $H_2O$. The honeycomb cell structure is housed within a gas-tight, sheet metal or cast-metal heat resistant housing or can.

Honeycomb structures currently employed are typically comprised of a ceramic material such as cordierite; a brittle material exhibiting limited mechanical strength. For this reason, catalytic converters in use today, typically include a supporting mat which is wrapped around the periphery of the honeycomb. This resilient material, which distributes any compressive forces on the ceramic, typically expands as the temperature increases. This being the case, the compressive supporting pressure on the honeycomb therefore increases at elevated temperatures, and in some degree compensates for the thermal expansion of the outer metal shell. Since the metal shell expands more than the enclosed ceramic honeycomb, this mat expansion with temperature rise prevents the honeycomb from becoming loose in the can shell.

There are known to the art various methods of fabricating catalytic converters as described above, one such method is described in U.S. Pat. No. 4,093,423 (Neumann) and U.S. Pat. No. 4,148,120 (Neumann), which generally discloses covering the outer circumferential surface of a monolithic carrier with an elastic intermediate layer and wrapping a rectangular piece of sheet metal around the covered body and thereafter pulling the ends of the metal shell together so as to exert a radial pressure on the surface of the carrier body within the range of 20 to 80 $N/cm^2$.

Another such method of fabrication, commonly referred to as the "tourniquet wrap" method, is disclosed, for example in U.S. Pat No. 5,082,479 (Miller). This method involves forming a rectangular flat sheet metal piece into a cylindrical body having a lap joint. A mat-wrapped honeycomb is loosely inserted into the cylindrical metal can and the combined assembly is pulled together to form the desired mat compression. Thereafter, the lap joint is welded together thereby holding the can at the desired compression while at the same time preventing gas leakage It is known that the amount of compressive pressure exerted on a given honeycomb substrate by compressively closing the metal shell and supporting mat around the honeycomb substrate will be significantly affected by the honeycomb's outside diameter, the thickness and compliance of the supporting mat material and the metal shell dimensions. Each of these dimensions have manufacturing tolerances which must be carefully controlled to insure that adequate, but not excessive, radial pressure, is applied to the honeycomb substrate. Because of the great difficulty associated with holding very close manufacturing tolerances, a significant percentage of catalytic converters are either too tight, causing axial tensile loads on the honeycomb, or too loose resulting in unreliable axial retention of the honeycomb. Although the aforementioned prior art references each disclose a form of compressively closing the metal shell and the supporting mat in a manner which accounts for the tolerance problems, no suggestion exists to indicate precisely controlling the compressive closing so as to utilize an optimum closing force which ensures that there is sufficient retention while at the same time ensuring that the force utilized in closing is not so great as to damage the supporting mat material and the honeycomb substrate retained therein.

SUMMARY OF THE INVENTION

It is therefore an objective of the present invention to disclose a formation method which overcomes the problems and shortcomings of the current compressive closing methods for forming catalytic converters. In other words, the present invention discloses a method of forming catalytic converters which achieves a substantially uniform compressive load upon the honeycomb structure which is sufficient to retain, but not damage the retained honeycomb substrate.

Forming a catalytic converter utilizing a compressive closing method generally involves wrapping the substrate in a sufficient amount of supporting mat material and inserting the wrapped substrate into the metal shell, compressively closing the metal shell around the wrapped substrate, and securing together the metal shell to provide a gas tight seal and to hold the imparted compressive stress.

The present inventive method of forming a catalytic converter involves compressively closing the metal shell around the wrapped substrate utilizing an optimized mat density thereby resulting in the supporting mat exhibiting a substantially uniform and maximum safe compressive stress on the substrate which is below the biaxial compressive strength of the honeycomb substrate. In the present method for forming the catalytic converter, the optimized mat compression or mat density is determined by plotting the mat density-mat holding pressure relationship and the mat density-retained cyclic strength ratio relationship of the supporting mat material against each other and selecting an optimized range on the mat density-mat holding pressure plot at some point proximate where the two plots intersect. An optimized mat density range, representative of the optimized mat compression, is then translated into an optimized compressive closing force for the type of supporting mat utilized.

The present invention provides a method for forming a catalytic converter involving closing the metal shell to an optimal mat density or compression thereby minimizing variability in mat compression upon the enclosed substrate typically characteristic of forming methods which close to a fixed gap between the can and the substrate. The present method utilizes a high enough compressive force so as to produce a catalytic converter having a supporting mat which exhibits a sufficient retentive force to maintain the substrate in place, yet the method utilizes a low enough compressive force so as not to damage mat supporting material. Furthermore, the compressive force is sufficient to result in a supporting mat which is dense enough to resist gas erosion. In addition, this catalytic converter formation method allows for both variability in the substrate geometry and the properties exhibited by the supporting mat. Specifically, this method is capable of compensating for substrate diameters which are variable within current manufacturing tolerances, as well as supporting mat materials having a variable weight basis. In other words, this method, regardless of the geometry of the finished honeycomb ceramic part and the supporting mat material property variability, produces catalytic converters wherein the retentive frictional force remains consistent, uniform and optimized.

DETAILED DESCRIPTION OF THE INVENTION

Figure 1:
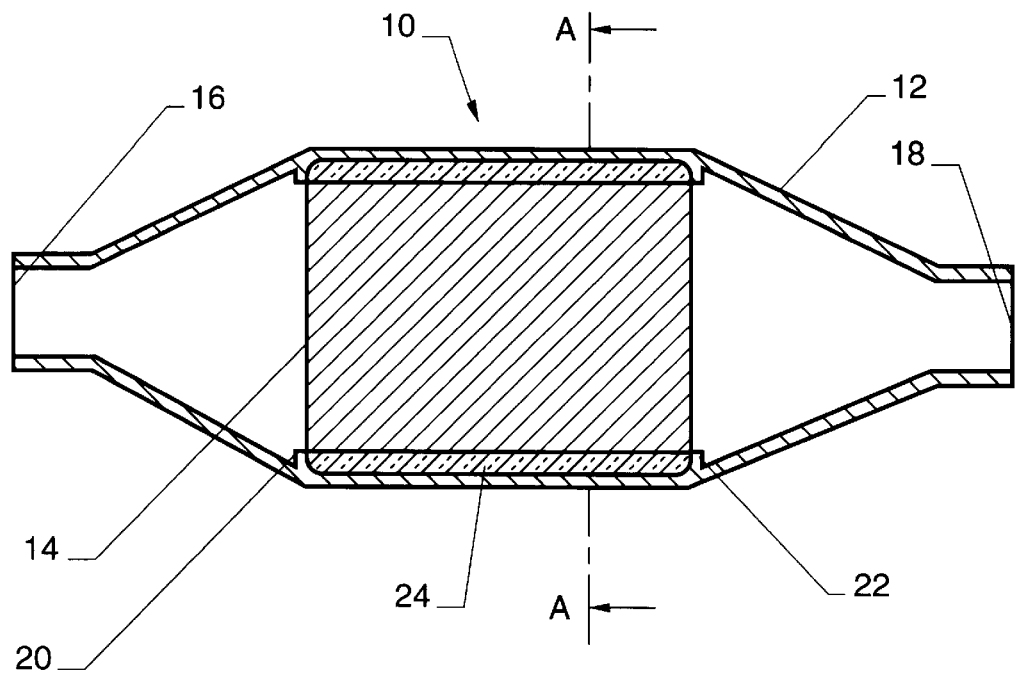
FIG. 1 is a schematic longitudinal sectional view of a catalytic converter, having a honeycomb structure, made in accordance with the method described herein.
Figure 2:
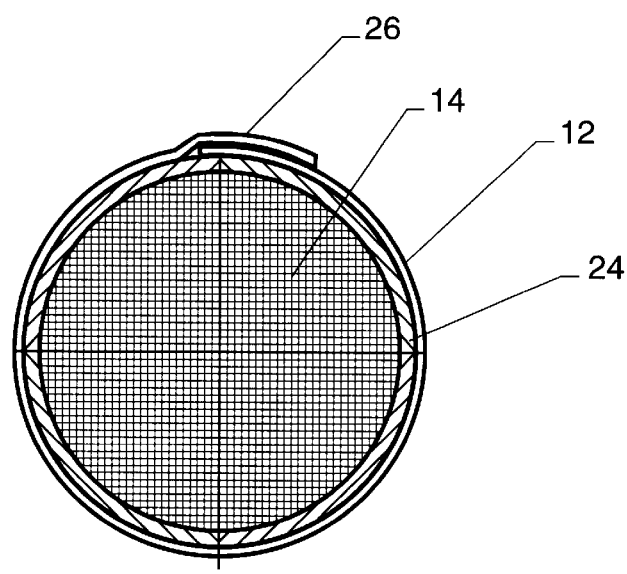
FIG. 2 is a cross-sectional view of the converter of FIG. 1 taken along the section line A—A.

The present invention relates to a process of forming catalytic converters, and more particularly to a method of forming catalytic converters comprising compressively closing the metal shell around the supporting mat-wrapped honeycomb substrate to an optimized mat density or compression thereby resulting in a uniform and maximum safe compressive force being exerted upon the honeycomb substrate. FIGS. 1 and 2, illustrate a typical catalytic converter comprising a ceramic honeycomb structure which functions as the catalyst structure or carrier. The catalytic converter 10 comprises a cylindrical ceramic honeycomb 14 and metallic casing or can 12 enclosing the same. Can 12 is formed of a material capable of resisting under-car salt, temperature and corrosion; ferritic stainless steels including grades SS-409, SS-439, and more recently SS-441 are however, generally preferred. The choice of material depends on the type of gas, the maximum temperature and the like. Honeycomb 14 is formed by extruding a ceramic material such as cordierite. Can 12 has inlet and outlet ports 16 and 18. Gas introduced through inlet port flows through individual cells of honeycomb 14 and out through outlet port 18.

Ceramic honeycomb 14, has square cells, although the cells of the honeycomb may have shapes other than square, including triangular, rectangular and the like. In consideration of the tooling costs for extrusion molding or the like, however the cells are generally square in shape.

Ceramic honeycomb 14 is supported on can 12 by means of ceramic fiber mat or wire mesh 24 for use as a shock absorber. Fiber mat 24, having a width substantially equal to the length of the honeycomb 14, is interposed between honeycomb 14 and can 12, and is set by proper heating, in the case of intumescent fiber mat materials. No such heating is beneficial for non-intumescent mat materials, and full radial mat pressure is achieved simply through can closure. The set fiber mat presses the outer periphery of the honeycomb thereby fixing it against axial motion from either a drag caused by the gas flow or mechanical vibration. Abutting pieces 20 and 22 may protrude from the inner periphery of can 12, whereby fiber mat 24 is prevented from being longitudinally dislocated with respect to can 12 by the drag from the gas flow or associated vibrational accelerations. However, in the case wherein the mat compressive forces are uniform and optimized and the particular mat is, as a result, sufficiently compressed to resist direct erosion by gas flow, which is the case in the instant method, the abutting pieces 20 and 22 not altogether necessary. As such, one benefit of an optimized mat density is that the catalytic converter design may be simplified to omit the abutments 20 and 22.

The method for forming catalytic converters like those shown above in FIGS. 1 and 2, generally involves the following steps: (1) forming a cylindrical metal shell exhibiting a substantially uniform curvature and having a lap joint; (2) wrapping a honeycomb substrate in a sufficient amount of supporting mat material and inserting the wrapped honeycomb into the metal shell; (3) compressively closing the metal shell around the wrapped honeycomb; and (4) securing the can ends to together to hold the compressive force imparted.

Referring specifically now to the last step of securing of the two ends together, the preferred way of accomplishing this involves utilizing a metal can which includes a lap joint 26 and welding the inner surface of the lap joint to the outer surface of the outer metal shell to provide a gas tight seal and to hold the compressive stress.

The present invention more particularly relates to an improvement in the above described method which comprises utilizing an optimized mat density or compression during the compressive closing of the metal shell around the wrapped honeycomb. The optimization described herein is based on, and formulated from, two key measures. The first, mat holding pressure, is a measure of initial holding strength; i.e., the minimum strength value below which the holding strength is insufficient to perform adequately upon first exposure to the exhaust gas flow. The second, retained cyclic strength ratio, is a measure of long term retention of strength in the presence of cyclic thermal and/or mechanical stresses. Specifically, determining the optimized mat density involves plotting a measure of the initial mat density versus the mat holding pressure and next plotting, on the same graph, the mat density versus the retained cyclic strength ratio; it is noted that the respective plots intersect. In this plot the x-axis is the common variable, mat density (g/cc) while the y-axis includes both the measure of initial holding pressure (kPa) and the measured retained cyclic strength ratio. The retained cyclic strength ratio is a comparison of the initial compressive strength versus that compressive strength measured at some later time after a number of predetermined thermal or mechanical cycles. Specifically, either retained mat compressive strength or retained shear strength after thermal cycling, or whatever cyclic test is familiar to skilled artisan, could be utilized to calculate this retained cyclic strength ratio measure.

After these aforementioned relationships are determined and plotted mat compression or mat density is determined by selecting some range on the mat density-mat holding pressure relationship plot which is proximate to the point where the two relationship plots intersect and translating that plot range to the corresponding optimized mat density range. More specifically, this mat density range should be a range which is within ±20% of the mat density measure where the two relationships intersect. Using this mat density range measure, a corresponding optimized compressive closing force is then calculated. It is self-evident that the optimized mat density is dependent upon the particular mat system selected and thus varies from mat material to mat material. In the case of the non-intumescent mat materials typically the optimized mat density is lower than that for other families of mat materials, such as the intumescent materials. An alternative to using the optimized mat density range measure is to use an optimized mat holding pressure range.

The mat density-retained cyclic strength ratio relationship can be determined by any conventional method. Generally, the method involves subjecting the supporting mat, at an elevated temperature, to an amount of compressive pressure necessary to achieve a predetermined mat density. This procedure is repeated a predetermined number of times (testing cycles), recording for each instance the amount of compressive pressure required to obtain the same initial mat density. Over the cycle life the amount of compressive pressure required to attain the same initial mat density becomes less as a result of damage to the fiber which occurs as result of this repeated compressive pressure. For each of the various mat densities measured, the mat is given a retained cyclic strength ratio measure ranging from zero to one. A mat density having a ratio value of 1 (high retained cyclic strength) means that a mat exhibiting this mat density has retained 100% of its strength and ability to resist compression and thus nearly the same amount of pressure is required to achieve the initial mat density after the predetermined number of testing cycles. On the other hand, a mat density having a ratio value of 0 (low retained cyclic strength) means that the mat material exhibiting this mat density has completely lost its ability to resist compression. This testing process is repeated for various mat densities to which the mat is capable of achieving, and thereafter using the mat densities and retained cyclic strength ratio data to generate the mat density-retained cyclic strength ratio relationship.

A preferable method for determining the retained cyclic strength ratio involves preparing flat mat material specimens of a known area and weight basis (mass/unit area). The flat specimens are positioned between parallel flat surfaces of a mechanism that compresses the specimens repeatedly to the thickness corresponding to the targeted mat density; the applied force typically being cycled from 15% to 100% of the peak load. In one preferred embodiment, the mechanism is constructed so as to operate at an elevated temperature of 750° C. In this embodiment the parallel flat surfaces are the flat ends of low expansion glass rods. One benefit of this embodiment is that the thermal expansion of the mechanism, glass rods in this embodiment, is negligible, thereby enabling a stable geometric setup. The force required to compress the mat to the initial density is measured for each cycle as the number of cycles is accumulated to the predetermined 1000 cycles. The retained cyclic strength ratio is calculated by dividing the force required at the $1000^{th}$ cycle by the force required at the first cycle. Although it is preferred that the data be generated for 1000 cycles and with the mat compressive force varying between a large range from 15% to 100% of the peak load, a lesser range of loads over a greater number of accumulated cycles would be an acceptable alternative procedure.

In general, as mat compression increases, stress in the fibers increases and at some "high level" of mat compression, fiber fatigue begins to occur. In other words, as the mat density increases, the mat holding pressure increases until some "high level" at which point this high holding pressure will no longer be able to be sustained. Based on this premise, it is known that for each mat density-retained cyclical strength ratio relationship, the plot, i.e., the mat material, exhibits an optimized mat density region where the strength properties are high, and will be expected to remain high for long durations. This mat density range is the optimized mat density or compression to which the mat material is compressively closed to.

In another embodiment the method for determining the retained cyclic strength ratio involves the use of cyclic temperatures rather than direct forces. In this embodiment, a series of canned catalytic converters are prepared with a range of mat densities. Subsequently, each of the various mat-density samples are exposed to a cyclic temperature in a manner similar to the temperatures experienced by a catalytic converter during vehicle start up, acceleration, and cool down. Given the fact that it is known that the metal shell expands more than the enclosed ceramic honeycomb as a result of temperatures increase, it therefore follows that the temperature changes cause changes in the mat compression. Preferably, the substrate and shell are cycled between near-ambient temperatures and 750° C. in predetermined cycle periods; cycles typically range from as low as 5 minute cycles to upwards of 100 minute cycles. After an appropriate number of cycles, preferably less than 10, each of the samples is tested for mat holding pressure and the resulting data is compared with standard mat holding pressure for same-density samples which have not exposed to the thermal cycling.

The mat density-mat holding pressure relationship can be determined by any conventional method known to the skilled artisan. A preferable method for determining mat holding pressure, termed the "hot push test", involves preparing a series of catalytic converter samples with a range of mat densities. The mat holding pressure is determined by applying, under elevated temperature conditions, an axial force of increasing magnitude until the substrate moves relative to the can. Dividing the force at the start of movement by the area of mat coverage on the honeycomb's cylindrical sidewall equates to the mat materials shear strength. The strength data and the corresponding mat density data are then plotted to generate the mat density-mat holding pressure relationship. It is contemplated that the shear strength increases with a corresponding increase in the density.

The process of the present invention is equally suitable for use with intumescent or non-intumescent supporting mat materials. Supporting mat materials suitable for use in this invention include ceramic fiber material such as either a simple non-expanding ceramic material or an intumescent materials, e.g., one which contains a vermiculite component that expands with heating to maintain firm compression when the outer steel expands outward from the ceramic monolith. Supporting mat materials which include a combination of both are also suitable. Acceptable non-expanding ceramic fiber material include ceramic materials such as those sold under the trademark "NEXTEL" or "SAFFIL" by the "3M" Company, Minneapolis, Minn. or those sold under the trademarks "CC-MAX" and "FIBERMAX" by the Unifrax Co., Niagara Falls, N.Y. Acceptable intumescent ceramics include ceramic materials such as those sold under the trademark "INTERAM" by the "3M" Company, Minneapolis, Minn. or sold under the trademark "XPE" by the Unifrax Co. of Niagara Falls, N.Y.

The process of the present invention may be used in combination with the method disclosed in copending, co-assigned U.S. patent application Ser. No. 60/027,705, (Schmitt), which is hereby incorporated by reference. Utilization of the principles taught in the present invention and those in the Schmitt reference will ensure that the catalytic converter produced will exhibit a honeycomb substrate which is subject to substantially uniform pressure exerted on it by the supporting mat and the metal can.

Figure 3:
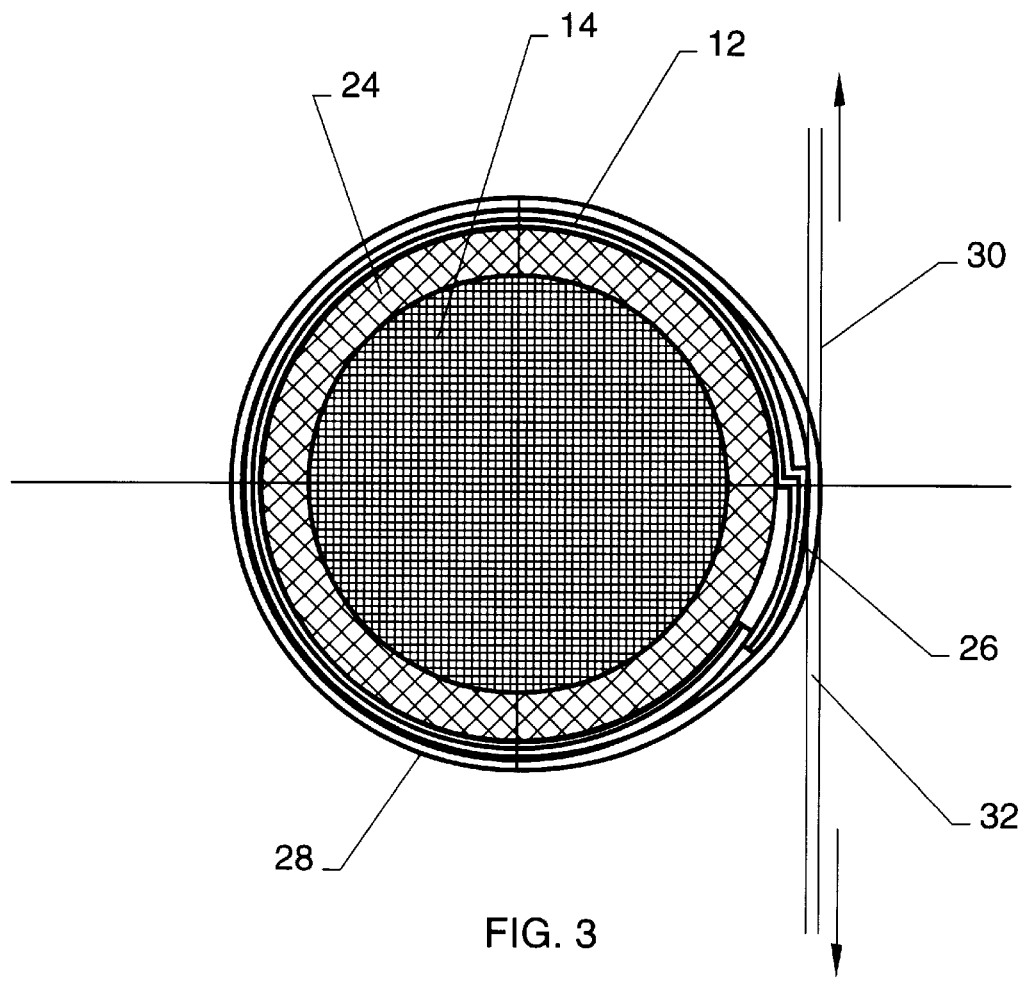
FIG. 3 is cross-sectional view of one embodiment of compressive closing, i.e., "tourniquet wrap", which is applicable in the instant method of forming a catalytic converter.

Referring now to FIG. 3, illustrated therein is one embodiment of compressive closing which may be employed to form the catalytic converter; i.e, a tourniquet strap technique. Specifically, the metal shell of the converter is wrapped in a metallic casing 28 which surrounds the periphery of the metal shell 12 and includes upper 30 and lower strap 32 ends which are pulled in opposite directions, as indicated by the arrows, to compressively close the metal shell 12 around the substrate 14 to the desired target optimized compression range. Thereafter, the metal shell 12 is secured to provide a gas tight seal and to hold the compressive stress and the strap is thereafter removed; preferably the method of securing involves welding the ends of the metal shell together.

Other methods of compressively closing the metal shell to form the catalytic converter include: (1) the use of metal shell die halves, exhibiting substantially the desired converter exterior shape, which are compressively closed together (e.g., "clam shell closure"); (2) collet closure; and, (3) independently controlled radial disposed jaws.

The mat density and thus the mat density-mat holding pressure and the mat density-retained cyclic strength ratio relationships and the optimized mat density or compression and optimized compressive closing force obtained in accordance with the above-described process will be specific for the specific supporting, intumescent or non-intumescent, mat material utilized. It is well known that this mat density and thus the aforementioned relationships will vary for each mat-supporting material. Therefore, new mat density-mat holding pressure and the mat density-retained cyclic strength relationships and optimized mat density and compressive closing forces should be established for each different supporting-mat material.

The present invention is further illustrated by the following non-limiting examples.

EXAMPLES

Example 1

A non-intumescent supporting mat material was obtained and the aforementioned mat density-mat holding pressure and mat density-retained cyclic strength ratio relationships for the mat material were generated in the following manner.

The testing for determining the mat density-retained cyclic strength for this mat material was done in accordance with the glass-rod compression method generally described above. Specifically, the test involved applying a sufficient compressive force, to the surface of the supporting mat so that the mat exhibited a mat density of 0.3 g/cc; the application of the compressive force was repeated for 1000 cycles and the actual force required to achieve the desired 0.3 g/cc was recorded for each instance. This procedure was then repeated for each of the following densities; 0.4, 0.5, 0.6 and 0.7 g/cc. Table I lists the retained cyclic strength ratio for each of the mat densities measured.

TABLE I

| Mat Density (g/cc) | Retained Cyclic Strength Ratio |
|---|---|
| 0.3 | 1.0 |
| 0.4 | 0.99 |
| 0.5 | 0.98 |
| 0.6 | 0.88 |
| 0.7 | 0.35 |

Table II lists the mat holding pressure obtained for each of the five (0.3, 0.4, 0.5, 0.6 and 0.7 g/cc) mat density values as determined using a standard 750° C. "hot push" test.

TABLE II

| Mat Density (g/cc) | Mat Holding Pressure (kPa) |
|---|---|
| 0.3 | 50 |
| 0.4 | 190 |
| 0.5 | 350 |
| 0.6 | 475 |
| 0.7 | 600 |

Figure 4:
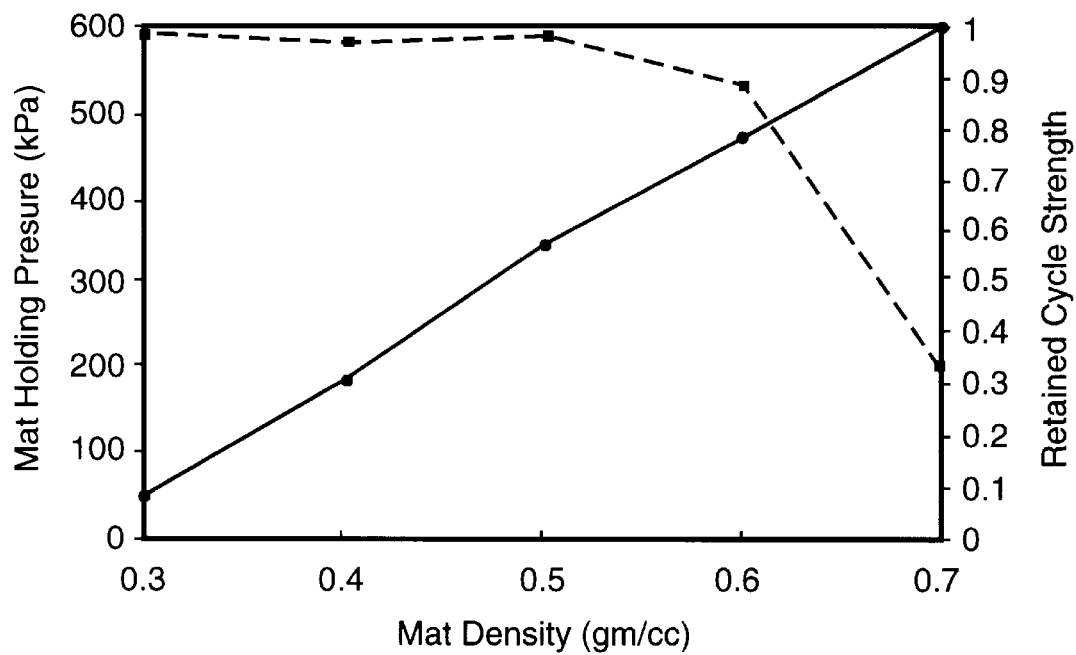
FIG. 4 is graph illustrating the mat density-mat holding pressure relationship co-plotted with the mat density-retained cyclic strength ratio of a certain commercially available non-intumescent supporting mat material.

Referring to FIG. 4, the mat density, retained cyclic strength ratio and mat holding pressure were plotted as illustrated; the mat density-mat holding pressure relationship represented by the solid line while the mat density-retained cyclic strength is represented by the dotted line. From this plot it was determined that the optimized mat density was approximately 0.50–0.60 g/c, preferably 0.55 g/cc, which corresponded to a mat holding pressure range of approximately 350–490 kPa, preferably 420 kPa.

After determination of the optimized mat density and mat compression, the optimized compressive closing force was determined to be between 790 and 810 pounds, preferably 800 pounds. Utilizing round ceramic substrates of a 35 mm diameter wrapped with 1800 gram per square meter mat material and can shells having a 1.21 mm thickness (type 409 stainless steel), a set of twenty samples were compressively closed to this optimized mat density utilizing the aforementioned tourniquet strap method.

When closed to the optimized mat density, the twenty samples produced an average mat density of 0.55 gram/cc with a ±95% range of 0.508 to 0.592 gram/cc.

Example 2

A commercially available intumescent supporting mat of 3100 grams per square meter weight basis was utilized and the optimized mat density and compressively closing force for this supporting mat were determined in the following manner.

Utilizing a standard 750° C. "hot push" test, as known to those skilled in the art, the mat holding pressure was obtained for the mat densities of 0.9, 1.1, 1.3, and 1.5 rams/cc. The holding pressures obtained, respectively, were approximately 400, 610, 850 and 910 kPa.

The retained cyclic strength ratio for this intumescent material example was obtained in the cyclic temperature manner as described above. Specifically, the temperature of each mat-density sample restrained mat was heated up to 750° C. and back to ambient in a 40 minute cycle with five cycles being performed for each of the three (0.9, 1.1 and 1.3 gm/cc) mat densities measured. To obtain the retained cyclic strength ratio, the peak pressure in the fifth heating cycle was divided by the pressure in the first cycle for each of the respective mat density samples.

Figure 5:
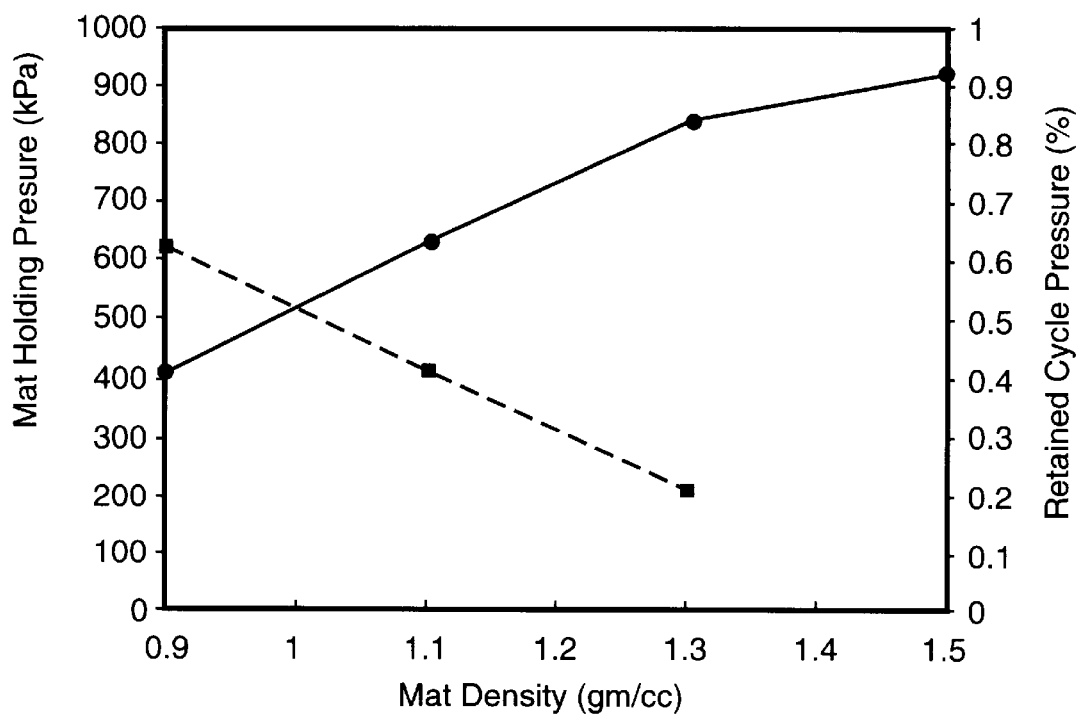
FIG. 5 is graph illustrating the mat density-mat holding pressure relationship co-plotted with the mat density-retained cyclic strength ratio of a certain commercially available intumescent supporting mat material.

Referring now to FIG. 5, the mat density, retained cyclic strength ratio and mat holding pressures obtained were plotted; the mat density-mat holding pressure relationship represented by the solid line while the mat density-retained cyclic strength ratio is represented by the dotted line. An examination of FIG. 5 reveals that, as predicted above, the mat holding pressure increases with increasing mat density. From this plot it was determined that the optimized mat density range was approximately 0.90–1.10 g/c, preferably 1.07 g/cc, which corresponded to a mat holding pressure range of approximately 410 to 630 kPa, preferably 600 kPa. It should be noted that the 1.07 mat density value was chosen as the preferable optimized mat density as it is located at the upper end of the optimized mat density range, therefore it would exhibit higher initial starting pressure than the lower end of the optimized range; i.e., 0.9 g/cc. Furthermore, it should be pointed out that although the 1.07 g/cc mat density value exhibited a lower retained strength ratio of 0.45 than the 0.9 g/cc mat density value of 0.625, in absolute units the actual tested strength obtained after the fifth cycle was generally equivalent to that of the 0.9 g/cc mat density value (254 kPa vs. 258 kPa); the lowered retained strength value being due to the higher initial tested strength exhibited by the 1.07 mat density value.

Although the invention has been described in detail for the purpose of illustration, it is understood that such detail is solely for that purpose, and variations can be made therein by those skilled in the art without departing from the spirit and intended scope which is defined by the following claims.

I claim:

1. A method of manufacturing a catalytic converter for purifying exhaust gases from an internal combustion engine, comprising the steps of wrapping a ceramic honeycomb substrate in a sufficient amount of supporting mat material to form a wrapped substrate and inserting the wrapped substrate into a cylindrical metal shell having opposite ends, compressively closing the metal shell around the wrapped substrate, and securing the opposite ends of the metal shell together to provide a gas tight seal and to hold the compressive stress around the wrapped substrate, wherein the improvement comprises:

compressively closing the metal shell around the wrapped substrate to an optimized mat density range thereby resulting in the supporting mat exhibiting a substantially uniform and maximum safe compressive stress on the ceramic honeycomb substrate, the optimized mat density range determined by plotting a mat density-mat holding pressure relationship plot and a mat density-retained cyclic strength relationship plot for the supporting mat material on a common graph, the respective plots forming an intersection point, and selecting an optimized range on the mat density-mat holding pressure relationship plot proximate to the intersection point and thereafter determining from the optimized range either a corresponding optimized mat density or mat holding pressure range and then calculating a compressive closing force range for compressively closing the metal shell.

2. The method of claim 1 wherein the optimized mat density-mat holding range is such that the corresponding mat density range is ±20% of the mat density value range which corresponds to the intersection point.

3. The method of claim 2 wherein compressively closing the metal shell around the substrate involves a tourniquet wrap method.

4. The method of claim 2 wherein compressively closing the metal shell around the substrate involves a clam shell style method.

5. The method of claim 2 wherein compressively closing the metal shell around the substrate involves a collet closure method.

6. A method of manufacturing a catalytic converter for purifying exhaust gases from an internal combustion engine, the converter having a monolithic ceramic substrate surrounded by a supporting mat, comprising the steps of:

wrapping the ceramic substrate in a sufficient amount of supporting mat material forming a wrapped substrate;

forming a cylindrical metal shell having opposite ends and an inner surface exhibiting substantially the same curvature as the wrapped substrate;

inserting the wrapped substrate into the metal shell having opposing ends; and, compressively closing the metal shell around the wrapped substrate to an optimized mat density range thereby resulting in the supporting mat exhibiting a substantially uniform and maximum safe compressive stress on the ceramic substrate, the optimized mat density determined by plotting a mat density-mat holding pressure relationship plot and a mat density-retained cyclic strength relationship plot for the supporting mat material on a common graph, the respective plots forming an intersection point and selecting an optimized range on the mat density-mat holding pressure relationship plot proximate to the intersection point and thereafter determining from the optimized range either a corresponding optimized mat density or mat holding pressure range and then calculating a compressive closing force range for compressively closing the metal shell;

securing together the opposite ends of metal shell to provide a gas tight seal and to hold the compressive stress around the wrapped substrate.

7. The method of claim 6 wherein the optimized mat density-mat holding range is such that the corresponding mat density range is ±20% of the mat density value range which corresponds to the intersection point.

8. The method of claim 7 wherein compressively closing the metal shell around the substrate involves a tourniquet wrap method.

9. The method of claim 7 wherein compressively closing the metal shell around the substrate involves a clam shell style method.

10. The method of claim 7 wherein compressively closing the metal shell around the substrate involves a collet closure method.

* * * * *